United States Patent

Dohogne et al.

[11] Patent Number: 5,610,461
[45] Date of Patent: Mar. 11, 1997

[54] MOTOR ENDSHIELDS

[75] Inventors: L. Ranney Dohogne; Robbie F. Johnson, both of St. Louis County, Mo.; Michael J. Rosenfeld, Licking County, Ohio

[73] Assignee: Emerson Electric Co., St. Louis, Mo.

[21] Appl. No.: 194,885

[22] Filed: Feb. 14, 1994

[51] Int. Cl.$^6$ .............................. H02K 5/00; H02K 5/04
[52] U.S. Cl. .............................................................. 310/89
[58] Field of Search .................................. 310/42, 58, 89, 310/90, 91, 254, 258

[56] References Cited

U.S. PATENT DOCUMENTS

| | | | |
|---|---|---|---|
| 3,343,013 | 9/1967 | Wightman et al. | 310/43 |
| 3,437,853 | 4/1969 | Arnold | 310/42 |
| 3,489,934 | 1/1970 | Lewis | 310/43 |
| 3,714,705 | 2/1973 | Lewis | 29/596 |
| 3,782,669 | 1/1974 | Lewis | 248/14 |
| 3,900,234 | 8/1975 | Roddy et al. | 308/15 |
| 4,071,794 | 1/1978 | Schoen | 310/154 |
| 4,110,644 | 8/1979 | Roddy et al. | 310/91 |
| 4,170,057 | 10/1979 | Roddy et al. | 29/596 |
| 4,219,245 | 8/1980 | Lewis | 308/29 |
| 4,245,870 | 1/1981 | Punshon | 308/36 |
| 4,306,168 | 12/1981 | Peachee | 310/217 |
| 4,319,150 | 3/1983 | Roddy et al. | 310/89 |
| 4,385,220 | 5/1983 | Bischoff | 200/293 |
| 4,689,507 | 8/1987 | Baker et al. | 310/62 |
| 4,801,831 | 1/1989 | Lewis | 310/91 |
| 4,823,032 | 4/1989 | Ward et al. | 310/43 |
| 4,914,331 | 4/1990 | Lewis | 310/90 |
| 4,992,151 | 5/1990 | Lewis | 310/91 |
| 4,992,690 | 2/1991 | Baker | 310/89 |
| 5,019,735 | 5/1991 | Lee | 310/89 |
| 5,278,469 | 1/1994 | Weber et al. | 310/89 |
| 5,475,275 | 12/1995 | Dohogne et al. | 310/89 |

*Primary Examiner*—Clayton E. Labelle
*Attorney, Agent, or Firm*—Polster, Lieder, Woodruff & Lucchesi

[57] ABSTRACT

An AC induction motor assembly includes first and second endshields at least one of which is of special construction for reducing material costs. The motor assembly includes a stator assembly and a rotor assembly having an associated rotor shaft, which are mounted between and supported by the endshields. The endshields are of a skeletal construction and include a plurality of truss members which are so configured as to permit the endshields to be made of different materials while retaining the same configuration. The truss members include two rails parallel with one another and oriented generally parallel to the axis of rotation of the rotor shaft, and a web extending between the rails, integral with them.

18 Claims, 4 Drawing Sheets

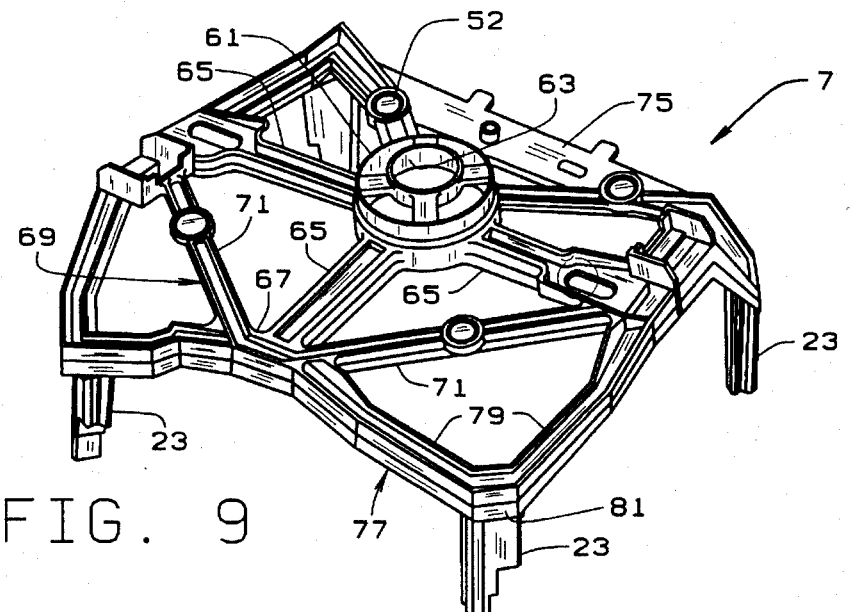
FIG. 9
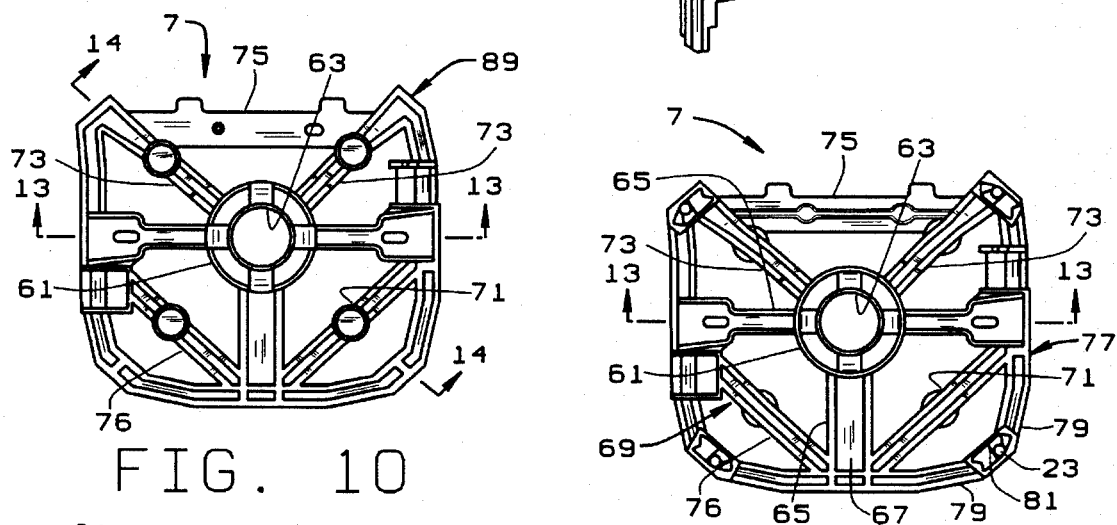
FIG. 10
FIG. 11
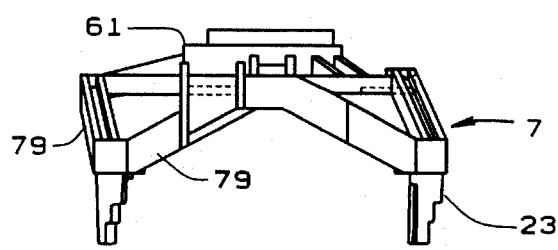
FIG. 12
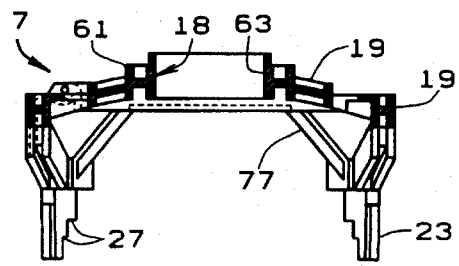
FIG. 13
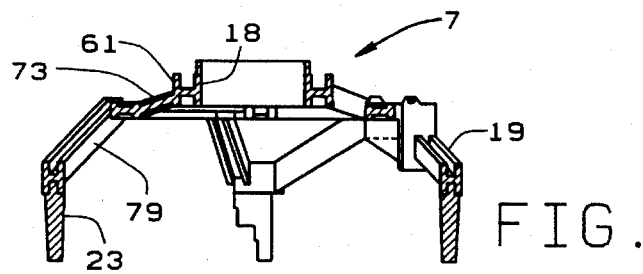
FIG. 14

MOTOR ENDSHIELDS

BACKGROUND OF THE INVENTION

For many appliance and other equipment applications involving high volume unit production, such as furnace fans, blowers for air conditioners, washing machines, dryers, and the like, original equipment manufacturers continually strive for cost reduction in their products. One way is to reduce the cost of the motor utilized in the product. In such applications, single phase induction motors having at least one main winding and a start winding of the resistance start split phase type conventionally have been used due to the economy inherent in their manufacture. While the invention disclosed hereinafter works well with and is described as applied to single phase induction motors, its applicability is not restricted to those motors.

A single phase induction motor generally has oppositely disposed endshields. A stator assembly conventionally includes a single phase main winding and a start winding arranged in slots in a laminated iron stator core and those windings cause currents to be induced in a squirrel cage winding arrangement in slots of a motor rotor. The rotor conventionally is carried on a shaft journaled in suitably lubricated bearings carried by the endshields. Although the endshields can be attached to the stator assembly in a variety of ways, in the endshield design of this invention, the two endshields have four legs which insert into channels or grooves in truncated corners of the stator core. The leg ends are then secured in place with epoxy injected into the joints between the legs and the walls of the channels. Such constructions are described in U.S. Pat. Nos. 3,343,013 and 4,110,644.

It is known to provide aluminum endshields of a skeleton frame construction rather than a full enclosure, because the motor is located inside an appliance. Present skeleton endshields weigh approximately 1.5 pounds and use 15.7 cubic inches of aluminum in finished form. The structural characteristics of the skeleton design are considered adequate, as established by a long history of successful market application. However, prior attempts to reduce the amount of material in the endshield design has resulted in performance problems. In the past, the cost of aluminum has fluctuated dramatically, and there are and have been a number of attempts made either to reduce the amount of material in the endshields or to find substitute lower cost materials.

Whether substitute materials are employed or whether the amount of aluminum is reduced, a straight reduction in the quantity of material used or the substitution of material is not feasible because while the endshields become lighter, they also become structurally weaker. The lighter and weaker endshields often cannot withstand the stresses under which they are placed and therefore are unsatisfactory.

Clearly, it would be highly desirable to be able to substitute one material for another, for example, fiber reinforced plastic for A380 aluminum alloy or vice versa, in response to the development of a substantial differential in their respective costs. This has not been economically feasible with skeletal designs known heretofore. It is not necessary in such substitutions that the cross-sectional dimensions of the elements making up the skeleton be the same when the different materials are used. It is necessary for the inside and outside dimensions that are critical to the parts of the motor contained within the embrace of the endshields and are critical to the fitting of the motor to or in the appliance to be the same when different materials are used.

One of the objects of this invention is to provide skeletal endshields of a configuration that are adapted to be used in producing endshields made of different materials.

Another object is to provide such an endshield which is structurally sound so as to stand up to normal use.

Another object is to provide such an endshield which is economical to produce.

Other objects will become apparent to those skilled in the art in the light of the following description and accompanying drawings.

SUMMARY OF THE INVENTION

In accordance with this invention, generally stated, a motor assembly is provided that includes a conventional stator core and windings and a rotor including a rotor shaft. First and second endshields are of unconventional configuration. The rotor shaft is journaled in the endshields for rotation. The first and second endshields are skeletal endshields made of a plurality of truss members. A bearing support in each endshield is supported by a plurality of truss members in the form of spokes. A bearing assembly is mounted in each bearing support. The rotor shaft is journaled in these bearing assemblies. The truss members are distinguished from one another by different names (e.g. framing beams, spokes, knee beams, brace beams) but each of them is made up of rails with a web extending between and integral with them. The truss rails are generally parallel with one another and to the axis of the rotor shaft. Hereinafter, the expressions "radially outwardly" and "radially inwardly" are used to mean respectively in a direction away from and a direction toward the axis of rotation of the rotor shaft, generally perpendicularly to the axis; the expressions "axially outwardly" and "axially inwardly" are used to mean respectively in a direction, generally parallel to the axis of rotation of the rotor shaft, away from and toward the nearest end face of the stator core.

One of the endshields, a base or mounting endshield, includes pins which extend axially outwardly from the endshield to mount the motor assembly in an appliance. This endshield has four framing beams of generally equal dimensions integral with outer ends of the spokes that support the bearing assembly. The framing beams are bowed radially outwardly. The spokes meet a radially inward rail of the framing beams in the centers of the spans of the framing beams. Short, radially extending platforms, each aligned with a spoke but on a radially outward side of the framing beams from the spoke, project radially outwardly from the radially outer rails which make up the sides of the framing beams. The mounting pins are integrally connected to the axially outer surface of the platforms, and extend axially outwardly from the platforms. Each of four knee beams is integral at an axially outer end with a platform. The knee beams slope axially inwardly, toward the stator core, and radially outwardly in the direction toward the core, and have at their inward end legs by which the endshield is mounted on the stator core.

The knee beams and legs are reinforced by brace frames. The brace frames angle axially inwardly with respect to the stator core, their radially outer ends being substantially displaced from the plane of the framing beams, with which the brace frames form generally triangular shapes. The radially outer ends of the brace frames are integral with the knee beams at their juncture with the legs. The legs extend axially inwardly from the outer ends of the knee beams into channels in truncated corners of the stator core.

The other endshield, sometimes referred to as the switch endshield, does not have mounting pins projecting from it, and does have provision for the mounting of a switch. To that end, two of the framing beams are shortened, to accommodate a switch mounting plate between and integral with them, and five spokes are connected to a central bearing assembly ring.

The legs of the first and second end shields are stepped at their free ends. The free ends of opposite endshields nest with one another. The steps are complementarily shaped to position the first and second endshields with respect to one another, and to provide greater surface area for the application of adhesive. The legs are secured to each other and to the stator assembly by epoxy adhesive, to complete the motor assembly. As has been indicated, the legs are received in grooves or channels, generally dovetails, extending axially in truncated corner surfaces of the stator core. The stator is preferably generally square in plan.

BRIEF DESCRIPTION OF THE DRAWINGS

FIG. 9 is a perspective view of a second endshield employed as a top or switch mounting endshield of the present invention;

FIG. 10 is a top plan view thereof;

FIG. 11 is a bottom plan view thereof;

FIG. 12 is a side elevational view thereof;

FIG. 13 is a cross-sectional view taken along the line 13—13 of FIG. 10; and

FIG. 14 is a cross-sectional view taken along line 14—14 of FIG. 10.

DESCRIPTION OF THE PREFERRED EMBODIMENT

Figure 1:
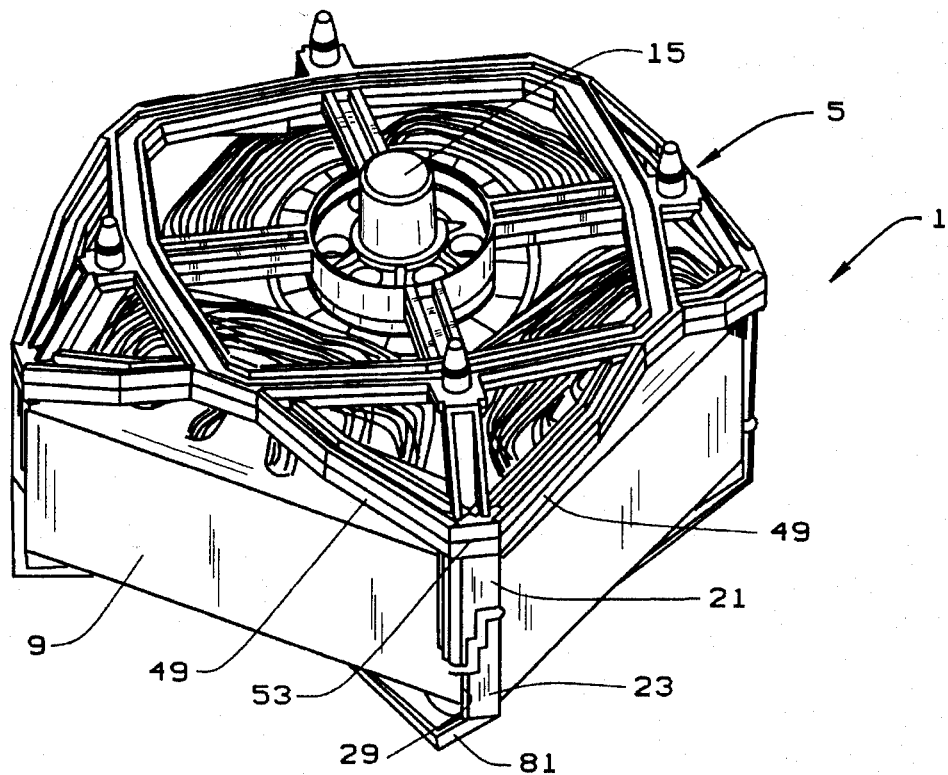
FIG. 1 is a view in perspective of one illustrative motor assembly employing truss endshield of the present invention.
Figure 3:
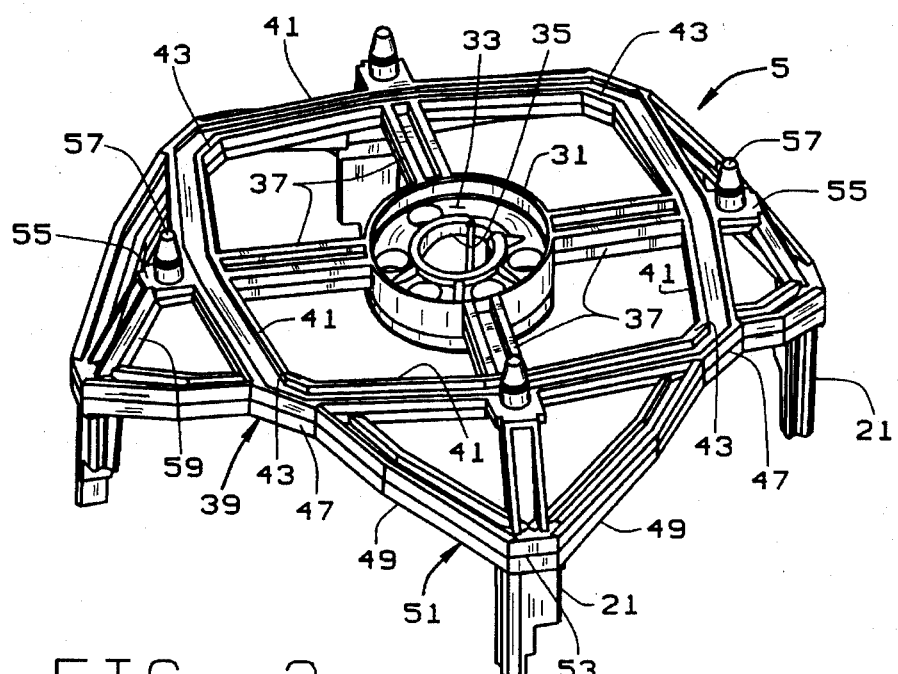
FIG. 3 is a perspective view of a first endshield employed as a base or mounting endshield for the motor of the present invention.
Figure 2:
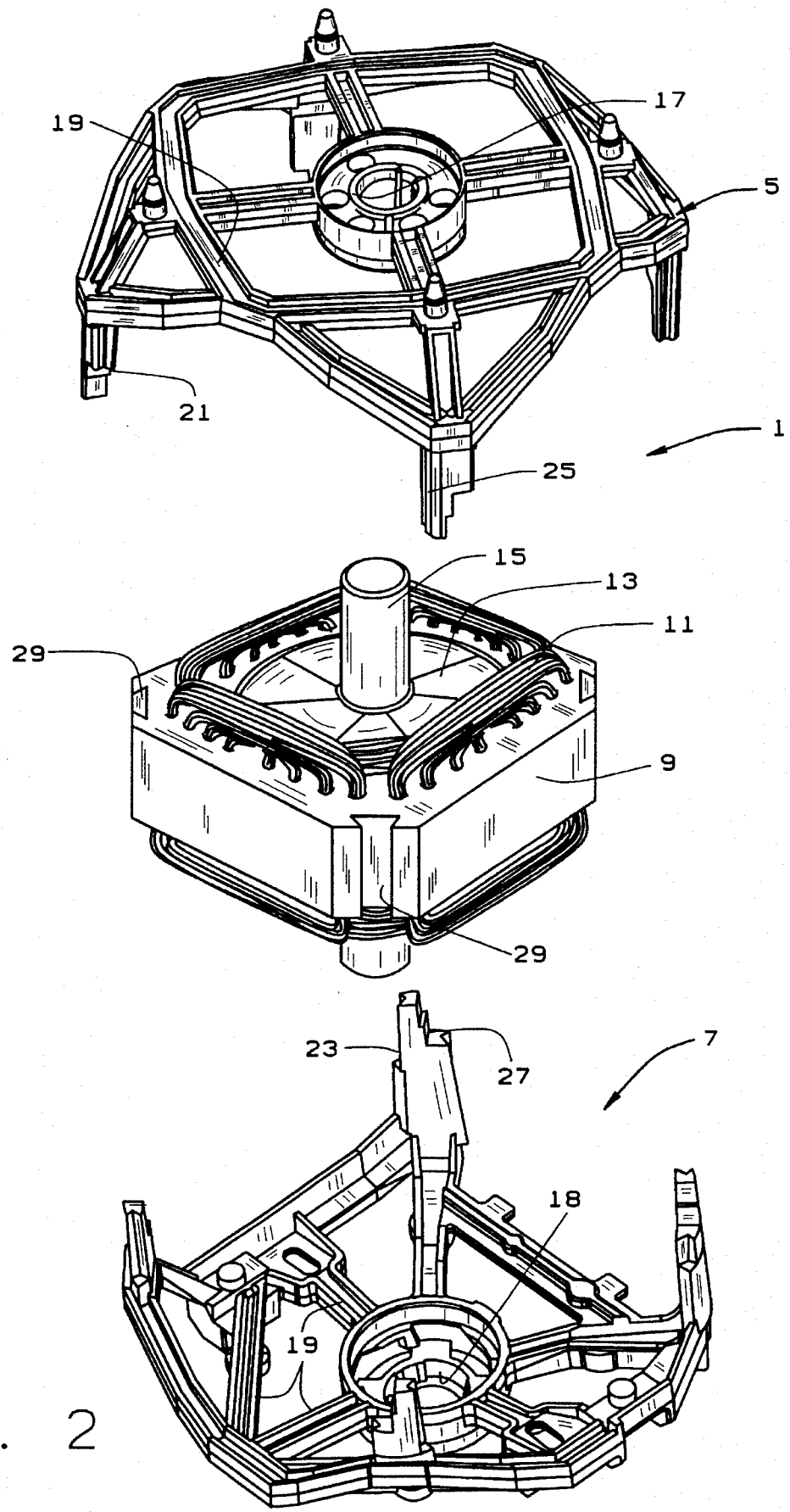
FIG. 2 is an exploded view of the motor assembly of FIG. 1.
Figure 4:
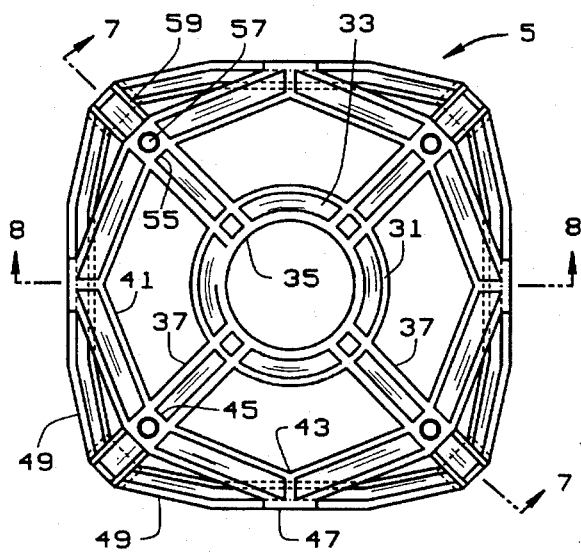
FIG. 4 is a top plan view thereof.
Figure 5:
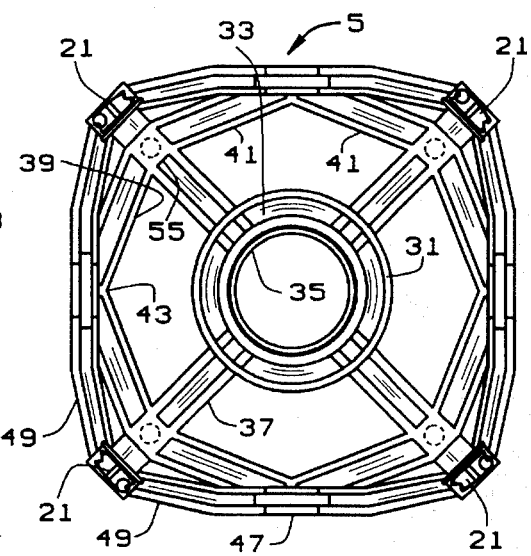
FIG. 5 is a bottom plan view thereof.
Figure 6:
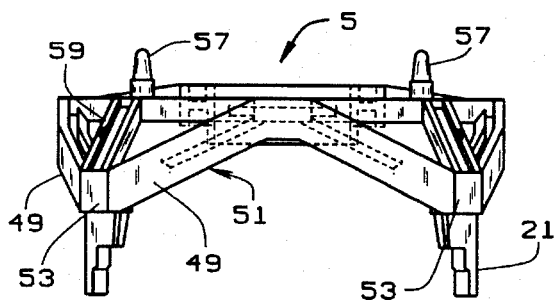
FIG. 6 is a side elevational view thereof.
Figure 8:
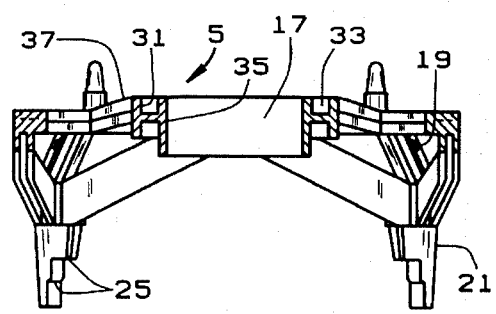
FIG. 8 is a cross-sectional view taken along the line 8—8 of FIG. 4.
Figure 7:
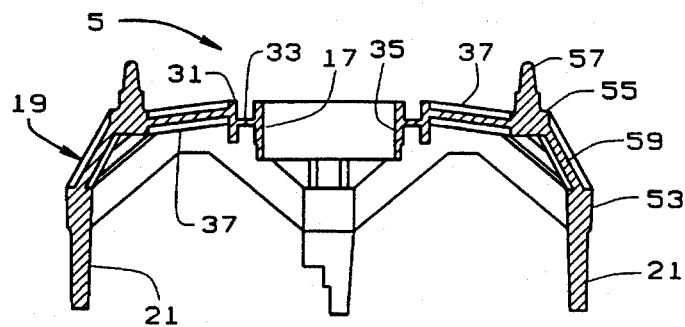
FIG. 7 is a cross-sectional view taken along the line 7—7 of FIG. 4.

A motor assembly 1 of the present invention is shown in FIGS. 1 and 2. Motor assembly 1 includes a first endshield 5 and a second endshield 7. A stator assembly 9 including a stator core 11, is positioned within the compass of the endshields 5 and 7. A rotor assembly 13 having a shaft 15 is mounted for rotation in stator core 11. The ends of shaft 15 are journaled in bearing assemblies 17 and 18, mounted in endshields 5 and 7, respectively, to support the rotor and shaft.

As seen, endshields 5 and 7 are skeletal or truss endshields. Each endshield is made from a plurality of beams 19 which are preferably H-shaped, as is best shown in FIGS. 7, 8, 13, and 14. Each endshield 5 and 7 has a plurality of legs 21 and 23, respectively. Legs 21 and 23 are stepped as at 25 and 27, respectively. Steps 25 and 27 are shaped complementarily to each other so that legs 21 and 23 may be mated to form one leg of generally uniform dimensions which extends between the two endshields. Legs 21 and 23 are received in dovetail slots 29 formed in the outer surface of truncated corners of stator core 11. Stator core 11, in the embodiment illustrated, is square in plan, and the slots 29 are dovetails formed in truncated corners of the stator core. Other stator lamination designs are compatible with the broader aspects of our invention. As is known in the art, legs 21 and 23 are secured to one another and to the core by epoxy adhesives, to assemble them around the stator-rotor-shaft assembly.

The structure of the endshields will now be described. The first, base, or mounting endshield 5 is shown in FIGS. 3–8. Endshield 5 has a central cylindrical ring 31 surrounding a radially inwardly extending annular plate 33. Ring 31 defines an opening 35 which receives a bearing assembly 17 to support the shaft and rotor. Bearing assembly 17 is conventional; any number of known bearing structures may be adopted for use in or with our invention. Spokes 37, integral at their radially inner ends with the ring 31, radiate outwardly from ring 31, and tend axially inwardly with respect to the stator core from their inner ends a small amount, for example, 0.146" in a 2" span. There are four spokes 37, evenly spaced around ring 31.

Spokes 37 are connected at their radially outer ends to a frame 39. Frame 39, in the embodiment illustrated, is eight-sided, being made up of four beams 41 of approximately equal dimensions, but angled at their midsection to give an eight-sided appearance. The ends of the beams meet at a flattened juncture or corner 43. Spokes 37 are joined to frame 39 at center areas of the spans of the beams 41, between the corners 43.

A platform 55 extends radially outwardly from the radially outward rail at the center 45 of each beam 41. A cylindrical mounting pin 57 with a conical outer end section, the base of which is smaller than the cylinder from which it projects, so as to provide an annular shoulder, is integrally formed with the endshield and extends axially outwardly from platform 55. Knee beams 59 angle axially inwardly and radially outwardly in a direction toward the stator core, each integral at its axially outer end with a platform 55. A leg 21 is integral at its axially outward end with the axially inward end of each knee beam 59.

The outer surfaces of corners 43 are flat, as at 47. Pairs of brace beams 49 extend radially outwardly and axially inwardly and toward each other from the edges of flats 47 to define triangular frames 51 with apices 53 where they are integral with the axially inner ends of the knee beams, at their juncture with the legs. The beams 49 angle axially inwardly to a greater extent than the spokes 37, for example, 1.12" in a 2.140" span. In the assembled motor, axially inward surfaces of apices 53 are adjacent the stator 9.

The endshield 5 is a mounting endshield and mounts motor assembly 1 in or to an appliance, not shown. Typically a frame in the appliance has a surface with openings therein which receive mounting pins 57 to position motor assembly 1 within the appliance.

Endshield 5 is formed in three generally parallel planes. The first and outermost plane is defined by an axially outer edge surface of ring 31. The second, middle plane is defined by frame 39. Apices 53 of triangular frames 51 define the third and axially innermost plane.

Switch end shield 7 is shown in FIGS. 9–14 and is formed generally similarly to end shield 5, in that it is skeletal and formed with rails and bridging webs, shown in the illustrative embodiment as H-shaped truss members, the rails being oriented generally parallel to the axis of rotation of the rotor shaft. It has a central cylinder 61 defining an inner axial opening 63 which receives the other bearing assembly 18. Five spokes 65 radiate outwardly and axially inwardly from cylinder 61, three to ends of frame members 71 and two to knee beams 89 between which a mounting plate 75 extends. Mounting plate 75 provides a support to which motor controls or switches, such as is shown in U.S. Pat. No. 3,782,669, may be secured. Two legs 23 extend from radially outward, axially inward ends of the knee beams 89. Triangular frames 77 are made of a pair of beams 79 connected at one end to the outer surfaces of corners 67 and at the other end to each other to define an apex 81 of frame 77. Two other legs 23 extend axially inwardly from apex 81. Again, when assembled, axially inward surfaces of apices 81 are adjacent stator 9. As can be seen, end shield 7 is also made in three generally parallel planes. The first and outermost plane is defined by an axially outer end surface of cylinder 61; the second, middle plane is defined by frame 69; and the third, innermost plane is defined by apices 81 of triangular frames 77.

The first, second, and third planes defined by the endshields are axially spaced from each other. The planes have circumferences which become progressively smaller. The first plane, adjacent the stator, has the largest circumference, and the third plane, holding the bearing assemblies, has the smallest circumference.

The truss endshields, with rails aligned parallel to the rotor axis, provide maximum strength and stiffness with minimum material. The beams can be of any material that can withstand the heat and stresses of the environment into which the motor assemblies are placed. It has been found that plastics and aluminum, for example, provide adequate materials for the endshields. For example, fiber reinforced plastic having 30 wt % glass-filled bulk molding compound has been found to be effective. This provides a light structure (about 1.3 lbs.) which is strong. The combined radial stiffness of the two fiber reinforced housings is between about 98,000 lb/in. and about 108,000 lb/in. depending on the loading direction. The use of any of these materials in the disclosed structure provides endshields that are less expensive to produce than the skeletal endshields currently used and that withstand the stresses to which they are exposed. It can be seen that making the beams of heavier section need not alter the critical dimensions of the end shield as far as the stator, rotor and windings of the motor are concerned, nor need it affect the critical dimensions of the motor with respect to an appliance on or in which it is to be mounted, because the rails can be made thicker in a direction toward one another, and the web accordingly shortened. The thickness of the web will not affect the critical dimensions, because of the orientation of the rails with respect to the axis of rotation of the rotor.

The foregoing description is set forth for illustrative purposes only. Variations, within the scope of the appended claims, will become apparent to those skilled in the art in the light of the foregoing disclosure. The stator could, for example, be circular, rather than square. Other stator core configurations can be used. Additional motor associated devices may be provided. For example, it is conventional to mount motor protectors for the motor and such a mounting is available at the endshield 7, for example at 52. Likewise, the truss structure permits air flow over the windings to be controlled in a manner not present in the prior art. To this end, one or more of the openings between trusses may have a thin layer of material closing such opening. Closure of one or more openings permits the motor designer to control air flow over the windings selectively. Even with such closure, however, the endshield structure described provides a substantially lower cost construction than that available in prior art designs with which we are familiar. Although the truss members of the illustrative embodiment have been shown are H-shaped in cross section, the web may be moved toward one edge of the rails. These variations are merely illustrative.

We claim:

1. In a motor assembly including a first endshield and a second endshield, a wound stator mounted to and between said endshields, a rotor mounted for rotation with respect to said stator, and a shaft extending from said rotor and being journaled in said endshields for rotation with respect to said stator, the rotor having an axis of rotation; the improvement comprising at least one of said end shields being a skeletal end shield comprising a plurality of truss members integral with one another; said truss members defining H-beams and all being made up of rails generally parallel with one another and oriented substantially parallel to the axis of rotation of said rotor, and a web extending between and integral with said rails; said skeletal endshield defining three generally parallel spaced apart planes, said planes being generally perpendicular to the axis of rotation of said rotor shaft.

2. The improvement of claim 1 wherein said one of said endshields is a mounting end shield comprising a bearing assembly mounting ring, spokes, one end of each of which is integral with said mounting ring, said spokes extending radially therefrom and being integrally connected at another end to framing beams, said framing beams being bowed radially, said framing beams carrying integrally formed mounting pins projecting axially outwardly from said motor assembly; knee beams integral with said framing beams, and legs integral with said knee beams, said framing beams being integrally connected to brace beams, said brace beams forming triangular members with said framing beams, said triangular members having apices with which ends of said knee beams are integral, said legs extending into channels in said stator core; said truss members including said spokes, framing beams, knee beams, and brace beams of said mounting end shield.

3. The improvement of claim 2 wherein the other of the endshields is a switch endshield, said switch endshield comprising a bearing assembly mounting ring, spokes, one end of each of which is integral with said mounting ring, three of said spokes extending radially therefrom and being integrally connected at another end to framing beams, and two of said spokes extending radially from said mounting ring and being integrally connected to knee beams, a mounting plate integrally connected to and between said knee beams, and legs, positioned complementarily to legs of said mounting endshield, mounted on said framing beams and said knee beams.

4. The improvement of claim 3 wherein axially inner ends of said legs are stepped, the legs of one end shield being stepped complementarily to those of the other of the end shields to position said first and second end shields with respect to each other when the endshields are assembled on said stator core, said legs being secured to each other along said steps.

5. The improvement of claim 3 wherein each of the end shields is made in one piece.

6. The improvement of claim 3 wherein said switch endshield defines three spaced apart generally parallel planes, a first plane being defined by an axially outer end surface of said cylinder, a second plane being defined by said frame, and a third frame being defined by said triangular frame apices.

7. The improvement of claim 6 wherein circumferences lying in said the planes are progressively radially smaller as they lie further axially from said stator.

8. The improvement of claim 2 wherein said framing beams consist of four beams of generally equal dimensions, said beams being bowed symmetrically radially outwardly to define outermost points on said frame; said frame including platforms extending radially outwardly from said outermost points, said mounting pins extending axially outwardly from said platforms.

9. The improvement of claim 8 wherein a knee beam extends between an outer edge of said platform and said brace beam frame at the apex of said brace beam frame contiguous said leg.

10. The improvement of claim 2 wherein said ring defines a first plane of said three planes, said frame defines a second frame; and said triangular member apices define a third plane of said three planes of said mounting endshield.

11. The improvement of claim 10 wherein circumferences lying in said planes are progressively radially smaller as they lie further axially from said stator.

12. In a motor assembly including at least one endshield, a stator mounted to said endshield, a rotor mounted for rotation with respect to said stator, and a shaft extending from said rotor and being journaled in said endshield for rotation with respect to said stator, the rotor having an axis of rotation; the improvement comprising said end shield being a skeletal end shield comprising a plurality of truss members integral with one another; said skeletal endshield defining three generally parallel spaced apart planes, said planes being generally perpendicular to the axis of rotation of said rotor shaft;

said end shield comprising a bearing assembly mounting ring, spokes, one end of each of which is integral with said mounting ring, said spokes extending radially and axially therefrom and being integrally connected at another end to framing beams, said framing beams being bowed radially, knee beams integral with said framing beams, and legs integral with said knee beams, said framing beams being integrally connected to brace beams, said brace beams forming radially and axially extending triangular members with said framing beams, said triangular members having apices with which ends of said knee beams are integral; said truss members including said spokes, framing beams, knee beams, and brace beams of said end shield;

wherein said mounting ring defines a first plane of said three planes, said frame defines a second of said three planes, and said triangular member apices define a third of said three planes.

13. The improvement of claim 12 wherein said first plane is the axially outermost plane, said second plane is the middle plane, and said third plane is the axially innermost plane.

14. The improvement of claim 13 wherein circumferences lie in said planes, the circumference in said first plane being radially smaller than the circumference in said second plane, and the circumference in said second plane being smaller than the circumference in said third plane.

15. The improvement of claim 12 wherein said endshield is a switch endshield, said switch endshield comprising five of said spokes, three of said spokes extending radially from said mounting ring and being integrally connected at another end to framing beams, and two of said spokes extending radially from said mounting ring and being integrally connected to knee beams, a mounting plate integrally connected to and between said knee beams.

16. The improvement of claim 12 wherein said endshield is a mounting endshield and wherein said framing beams carry integrally formed mounting pins projecting axially outwardly from said motor assembly.

17. The improvement of claim 12 wherein said truss members are all made up of rails generally parallel with one another and oriented substantially parallel to the axis of rotation of said rotor, and a web extending between and integral with said rails.

18. The improvement of claim 17 wherein each of said truss members is H-shaped in cross-section.

* * * * *